June 9, 1953 T. A. BELL 2,641,411

ZEROIZING MECHANISM FOR COMPUTER MACHINES

Filed Dec. 12, 1951 3 Sheets-Sheet 1

Inventor:
Thomas Andrew Bell
by his Attorneys
Howson & Howson

June 9, 1953 T. A. BELL 2,641,411

ZEROIZING MECHANISM FOR COMPUTER MACHINES

Filed Dec. 12, 1951 3 Sheets-Sheet 2

Inventor:
Thomas Andrew Bell
by his Attorneys
Howson & Howson

June 9, 1953 T. A. BELL 2,641,411

ZEROIZING MECHANISM FOR COMPUTER MACHINES

Filed Dec. 12, 1951 3 Sheets-Sheet 3

Inventor:
Thomas Andrew Bell
by his Attorneys
Howson & Howson

Patented June 9, 1953 2,641,411

UNITED STATES PATENT OFFICE 2,641,411

ZEROIZING MECHANISM FOR COMPUTER MACHINES

Thomas Andrew Bell, Petersham, near Sydney, New South Wales, Australia, assignor of one-half to Edwin Stanly Sutton, Gordon, near Sydney, New South Wales, Australia Application December 12, 1951, Serial No. 261,181
In Australia December 20, 1950

5 Claims. (Cl. 235—144)

This invention relates to a computer mechanism such as that which is combined with liquid (for example, petrol) metering apparatus.

The object of the invention is to provide a simplified construction of the zeroising mechanism.

According to this invention the hand operated zeroising shaft geared to the quantity dial shafts and price dial shafts has two discs thereon each having a step catch in the periphery thereof. One disc is fixed to the shaft and the other has a limited rotary movement thereon. A spring is arranged to pull the free disc so that its catch moves out of line with the catch on the fixed disc and the two discs then present a continuous circular track. A stepped pawl spring held on the circular track is adapted to be pulled into engagement with the stepped catch on the "free" disc during the last part of a zeroising operation and to hold said disc until both catches are in line at the end of a zeroising operation when it also engages the catch on the fixed disc and stops movement of the zeroising shaft beyond zero position. A plate having a limited rotary movement relative to the zeroising shaft has means thereon adapted to lift said pawl at the start of a zeroising operation and so permit such operation.

Figure 1:
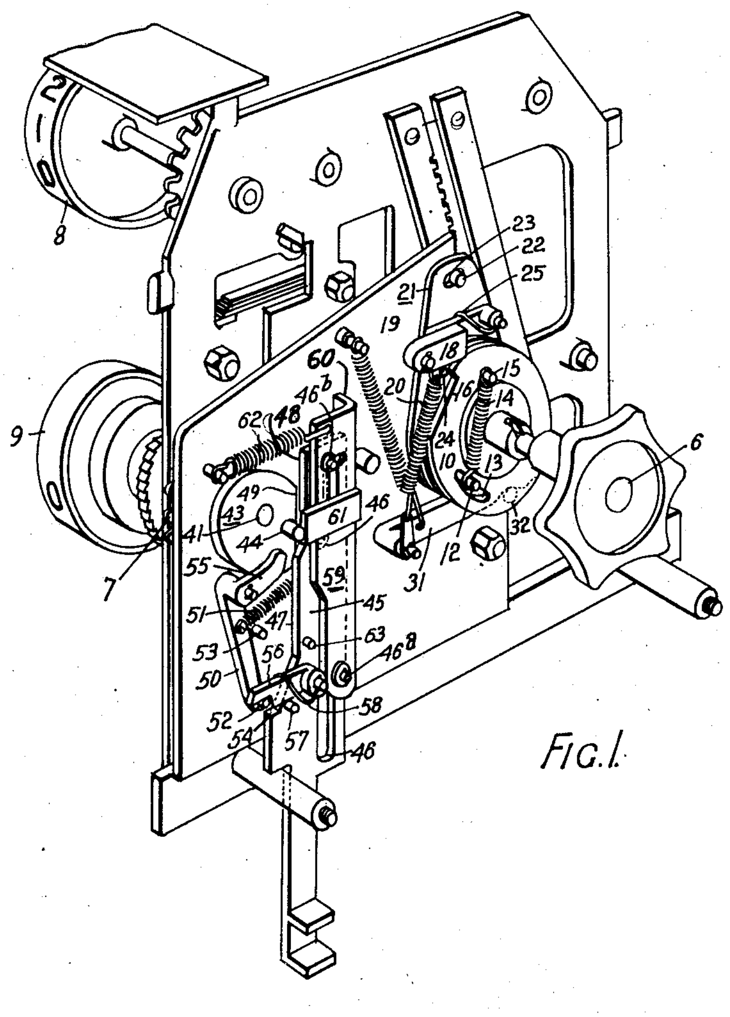
Figure 2:
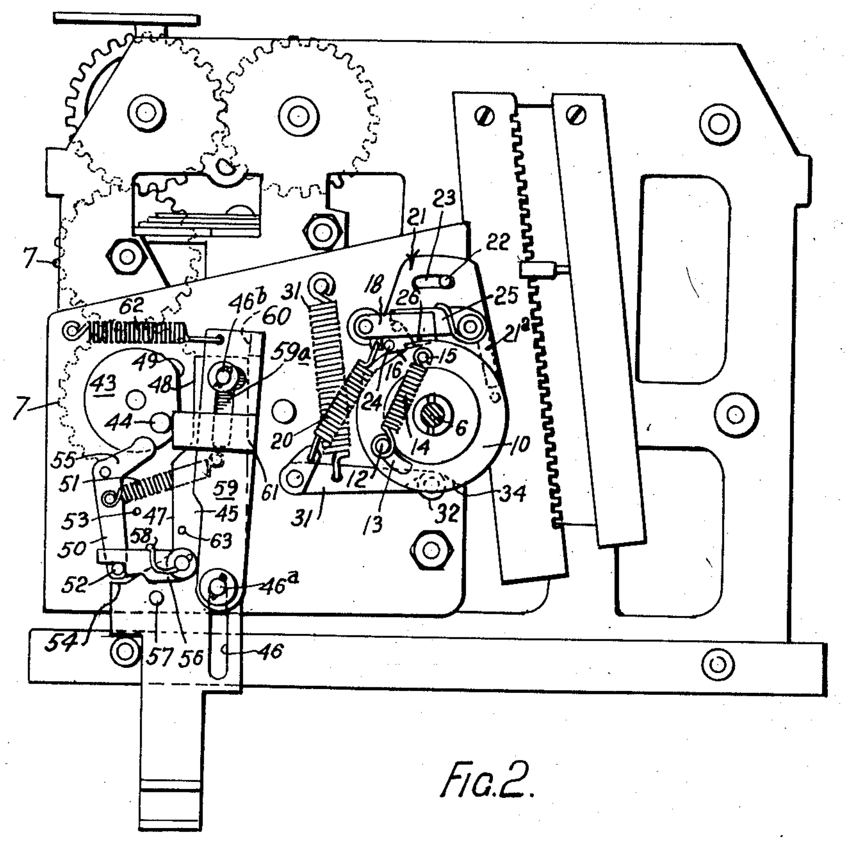
Figure 3:
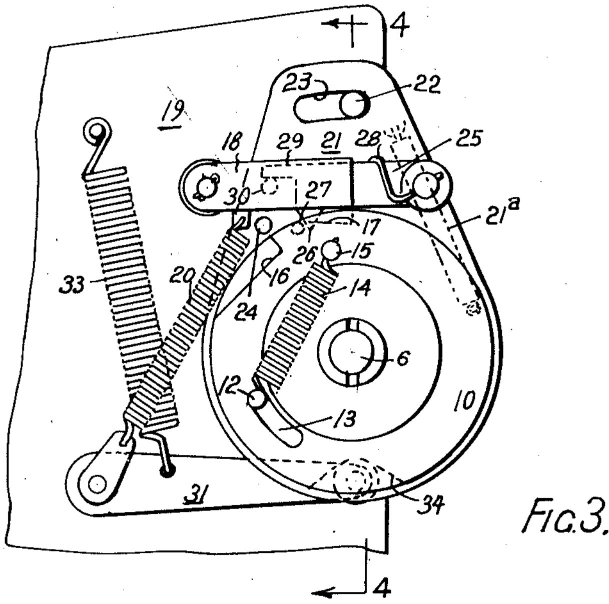
Figure 4:
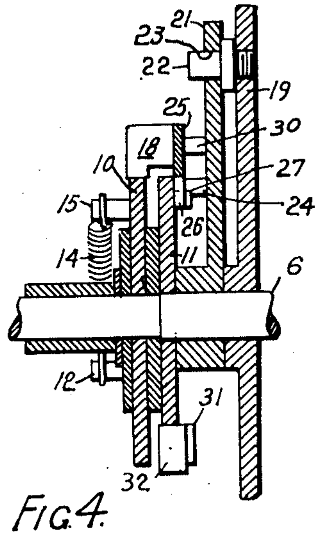
Figure 5:
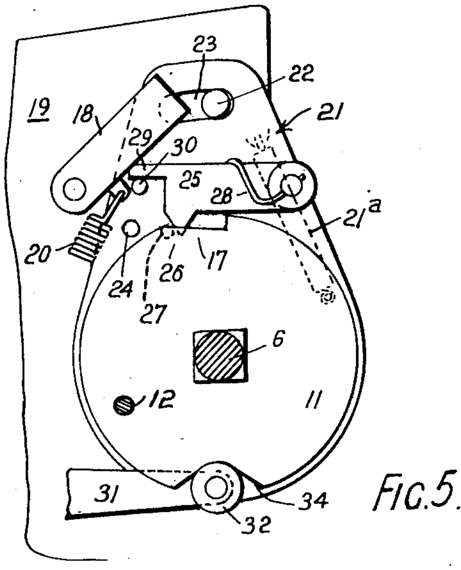

The foregoing and supplementary mechanism and means to control the operation of the pump switch in combination with the zeroising mechanism are described in detail with reference to the annexed drawings wherein Fig. 1 is a fragmentary perspective view of a computer showing the zeroising mechanism; Fig. 2 is a side elevation of the zeroising mechanism; Fig. 3 is an enlarged fragmentary elevation of the disc and plate assembly; Fig. 4 is a section on line 4—4 of Fig. 3; Fig. 5 is an elevation with the free disc removed and the pawl raised above its normal position.

The hand operated zeroising shaft 6 is engaged through a gear train indicated generally by the reference 7 and one direction slipping clutches with the quantity dials 8 and the price dials 9. There are two discs 10—11 on the zeroising shaft 6, disc 11 is fixed and disc 10 has a limited rotary movement thereon. The movement is limited by a pin 12 on the fixed disc 11 passing through a slot 13 in the free disc 10 and a helical spring 14 on this pin 12 connected also to a pin 15 on the free disc 10 tends to pull said disc to a determined position relative to the disc 11. There is a slide in step catch 16—17 on the periphery of each disc and a stepped pawl 18 pivotally mounted on frame 19 is adapted to be pulled by a spring 20 into engagement with the catches 16—17, firstly with the free disc and finally with both discs when the fixed disc reaches zero position. The pawl prevents movement of the shaft 6 beyond zero position in one zero setting operation.

A plate 21 mounted on the zeroising shaft has a limited rotary movement which is determined by pin 22 projecting from the frame 19 into slot 23. A spring 21*a* connected to the plate 21 and to the frame 19 exerts a pull on the plate in one direction. The plate 21 has a lift pin 24 thereon adapted to take under the pawl 18. It also has an arm 25 pivoted thereon and there is a V projection 26 on said arm adapted to engage a pin 27 on the fixed disc. It is drawn into such engagement by spring 28. A finger 29 on the arm 25 is adapted to register with a pin 30 on the plate 21 and so limit the downward movement of the arm.

A supplementary part of the zeroising mechanism consists of an arm 31 pivoted on the frame 19. It has a roller 32 on the free end which is held in engagement with the fixed disc 11 by spring 33. There is a catch slot 34 in the periphery of the fixed disc having a two way ramp or slide in edges. The roller 32 is adapted to enter this slot and by the pressure exerted assist in bringing the stepped catch 17 of fixed disc 11 into register position with the pawl 18 as said fixed disc nears the last part of its movement in a zeroising operation. The roller 32 is forced out of said slot 34 at the start of a zeroising operation.

To zeroise the mechanism the zeroising shaft 6 is turned by hand a part of a revolution in a clockwise direction to free it. This action causes the V projection 26 to be engaged by the pin 27 on the fixed disc 11 and the movement of the plate 21 by reason of such contact and against the resistance of the spring 21*a* causes the lift pin 24 thereon to lift the pawl 18. The free disc 10 is then pulled by its spring 14 anti-clockwise to the limit of its free movement where the step catches 16—17 on both discs overlap and as the zeroising shaft is turned anti-clockwise the plate 21 returns to its original position and the pawl 18 is free to ride on the periphery of both discs.

The zeroising shaft 6 is rotated anti-clockwise for one complete revolution from its original position. At the start of this movement the roller 32 is forced out of the catch slot 34. As the zeroising shaft nears the end of its movement the pawl 18 engages the catch 16 on the free disc 10 and holds it against the resistance of the spring 14 until at zero position the catches 16—17 of both discs 10—11 register and the catch 17 on the fixed disc 11 is also engaged by the pawl 18 thus preventing further movement in the anti-clockwise or zero setting direction. In addition the roller 32 enters the catch slot 34.

The quantity and price dials are drums 8 and 8 respectively which are so geared that one complete revolution of the zeroising mechanism will bring them all to zero.

The invention also includes means which automatically operate after the pump has been stopped, following a dispensing operation, to prevent the pump switch being moved to the "on" position again until the pump meter registering mechanism has been reset at zero. These means also prevent movement of the zero setting mechanism when the pump is in actuating position.

The means consist of a segment of a disc 43 on one of the shafts 41 in the zeroising train. A stop pin 44 projects from the face of the disc. A plate 45 having slots 46 therein by which it is vertically slidably mounted on pins 46a and 46b on the frame 19 is connected to and actuates the pump switch. The parts are arranged so that when the plate 45 is at the bottom of its travel the switch is in the "off" position and when at the top of its travel the switch is in the "on" position.

The plate 45 has a stepped edge 47—48, one part of which (47) registers with the chord edge 49 of the disc 43 when in the "on" position thus preventing rotary movement of the disc 43. This part of the stepped edge also prevents movement of the plate 45 to the "on" position if the mechanism has not been set to zero. The part 48 of the stepped plate permits rotary movement of the disc 43 when the plate 45 is in the "off" position.

A bell crank pivotally mounted on the frame 19 has a long limb 50 held by spring 51 against a rubbing edge of the plate 45. There is a trip pin 52 on this limb and a stop 53 on the base to limit movement of the bell crank. The foot of this limb is adapted to register with a step 54 on the plate 45 when the latter is moved to the "off" position and the mechanism has not been zeroised. It prevents movement of the plate to the "on" position again until the mechanism has been zeroised.

The other (short) limb of the bell crank is in the track of the stop pin 44 on the disc 43. When the mechanism is moved to zero position the stop pin 44 abuts the short limb 55, turns the bell crank against the resistance of the spring 51 and so moves the foot of the long limb 50 clear of the step 54.

A latch arm 56 pivotally mounted on the plate 45 and held against a stop 57 by a spring 58 is adapted to take on the trip pin 52 when the long limb of the bell crank is moved clear of the step 54 at zero position and by holding said long limb clear of the step, allow the plate to be moved to the switch "on" position. When so moved the trip pin 52 moves clear of the latch arm 56 and the long limb of the bell crank is freed so that it can engage the step 54 again when the plate 45 is moved to the "off" position.

A second latch arm 59 mounted on the pin 46a has a slot 59a of inverted L-shape through which pin 46b projects. It also has a lug 60 on the top and a ward 61 held in the track of the stop pin 44 by spring 62. When the plate 45 is moved to the "off" position and the ward is not engaged by the stop pin 44 the spring 62 pulls the latch arm so that the lug 60 moves over the top of the plate 45 thus preventing the plate being moved to the "on" position again until the stop pin 44 strikes the ward 61 again.

I claim:

1. In computer mechanism a zeroising mechanism consisting of a hand operated zeroising shaft geared to the quantity dial shafts and price dial shafts, two discs on said shaft, each said disc having a step catch on the periphery thereof, one disc being fixed to said shaft and the other having a limited rotary movement thereon, a spring arranged to pull said "free" disc so that its catch is out of line with the catch on the fixed disc, a stepped pawl pivoted on a frame adapted to be pulled into engagement with said stepped catches on the discs by a spring, a plate having a limited rotary movement relative to said zeroising shaft, a lift pin on said plate adapted on movement of said plate to lift said pawl, an arm pivoted on said plate having a V projection thereon adapted to be drawn into engagement with a pin on said fixed disc by a spring.

2. A zeroising mechanism as claimed in claim 1 actuated by first turning the zeroising shaft a part of a revolution in a clockwise direction thereby causing the said V projection to engage the pin on the fixed disc and the consequental movement of the plate causing the lift pin thereon to lift said pawl out of engagement with the catches on the discs whereupon the spring pulls the catch on the free disc out of alignment with the catch on the fixed disc so that the pawl can ride on the periphery of both discs, then turning the zeroising shaft anti-clockwise for one complete revolution from its original position when on approaching the original position again the pawl first engages the catch on the free disc and holds it until at zero position the catches on both discs come into alignment and are both engaged by the pawl thereby locking the zeroising mechanism.

3. In computer mechanism a zeroising mechanism consisting of a hand operated zeroising shaft geared to the quantity dial shafts and price dial shafts, two discs on said shaft, each said disc having a step catch on the periphery thereof, one disc being fixed to said shaft and the other having a limited rotary movement thereon, a spring arranged to pull said "free" disc so that its catch is out of line with the catch on the fixed disc, a stepped pawl pivoted on a frame adapted to be pulled into engagement with said stepped catches on the discs by a spring, a plate having a limited rotary movement relative to said zeroising shaft, a lift pin on said plate adapted on movement of said plate to lift said pawl, an arm pivoted on said plate having a V projection thereon adapted to be drawn into engagement with a pin on said fixed disc by a spring, said fixed disc having on the periphery thereof a catch slot with slide in edges, an arm pivoted to a frame having a roller on the free end and a spring to draw said roller into engagement with said catch slot, said roller being adapted to assist in stopping the fixed disc at the position where its stepped catch registers with the stepped pawl.

4. In computer mechanism a zeroising mechanism combined with means which will automatically operate after a pump switch has been moved to the "off" position to prevent the pump switch being moved to the "on" position until the pump meter registering mechanism has been reset at zero and to prevent movement of the zero setting mechanism when the pump switch is in the "on" position, said means consisting of a hand operated zeroising shaft geared to the quantity dial shafts and price dial shafts, two discs on said shaft, each said disc having a step catch on the periphery thereof, one disc being fixed to said shaft and the other having a limited rotary movement thereon, a spring arranged to pull said "free" disc so that its catch is out of line with the catch on the fixed disc, a stepped pawl pivoted on a frame adapted to be pulled into engagement with said stepped catches on the discs by a spring, a plate having a limited rotary movement relative to said zeroising shaft, a lift pin on said plate adapted on movement of said plate to lift said pawl, an arm pivoted on said plate having a V projection thereon adapted to be drawn into engagement with a pin on said fixed disc by a spring, a segment of a disc on one of the shafts of the quantity or price dial gear, said disc having a stop pin projecting from the face thereof, a vertically slidable switch control plate having a stepped edge one part of which registers with the chord edge of the disc when in the "on" position, the other part of said plate permitting rotary movement of said disc when the plate is in the "off" position, a bell crank having one limb held against a step on the edge of the plate by a spring when said plate is in the "off" position, said limb having a trip pin thereon, the other limb of said bell crank being in the track of the stop pin on the disc and adapted to be actuated thereby, a latch arm pivoted on said plate adapted to engage said trip pin and hold the first limb of said bell crank clear of said step.

5. In computer mechanism a zeroising mechanism consisting of a hand operated zeroising shaft geared to the quantity dial shafts and price dial shafts, two discs on said shaft, each said disc having a step catch on the periphery thereof, one disc being fixed to said shaft and the other having a limited rotary movement thereon, a spring arranged to pull said "free" disc so that its catch is out of line with the catch on the fixed disc, a stepped pawl pivoted on a frame adapted to be pulled into engagement with said stepped catches on the discs by a spring, a plate having a limited rotary movement relative to said zeroising shaft, a lift pin on said plate adapted on movement of said plate to lift said pawl, an arm pivoted on said plate having a V projection thereon adapted to be drawn into engagement with a pin on said fixed disc by a spring, said fixed disc having on the periphery thereon a catch slot with slide in edges, an arm pivoted to a frame having a roller on the free end and a spring to draw said roller into engagement with said catch slot, said roller being adapted to assist in stopping the fixed disc at the position where its stepped catch registers with the stepped pawl, a segment of a disc on one of the shafts of the quantity or price dial gear, said disc having a stop pin projecting from the face thereof, a vertically slidable switch control plate having a stepped edge one part of which registers with the chord edge of the disc when in the "on" position, the other part of said plate permitting rotary movement of said disc when the plate is in the "off" position, a bell crank having one limb held against a step on the edge of the plate by a spring when said plate is in the "off" position, said limb having a trip pin thereon, the other limb of said bell crank being in the track of the stop pin on the disc and adapted to be actuated thereby, a latch arm pivoted on said plate adapted to engage said trip pin and hold the first limb of said bell crank clear of said step.

THOMAS ANDREW BELL.

No references cited.